UNITED STATES PATENT OFFICE.

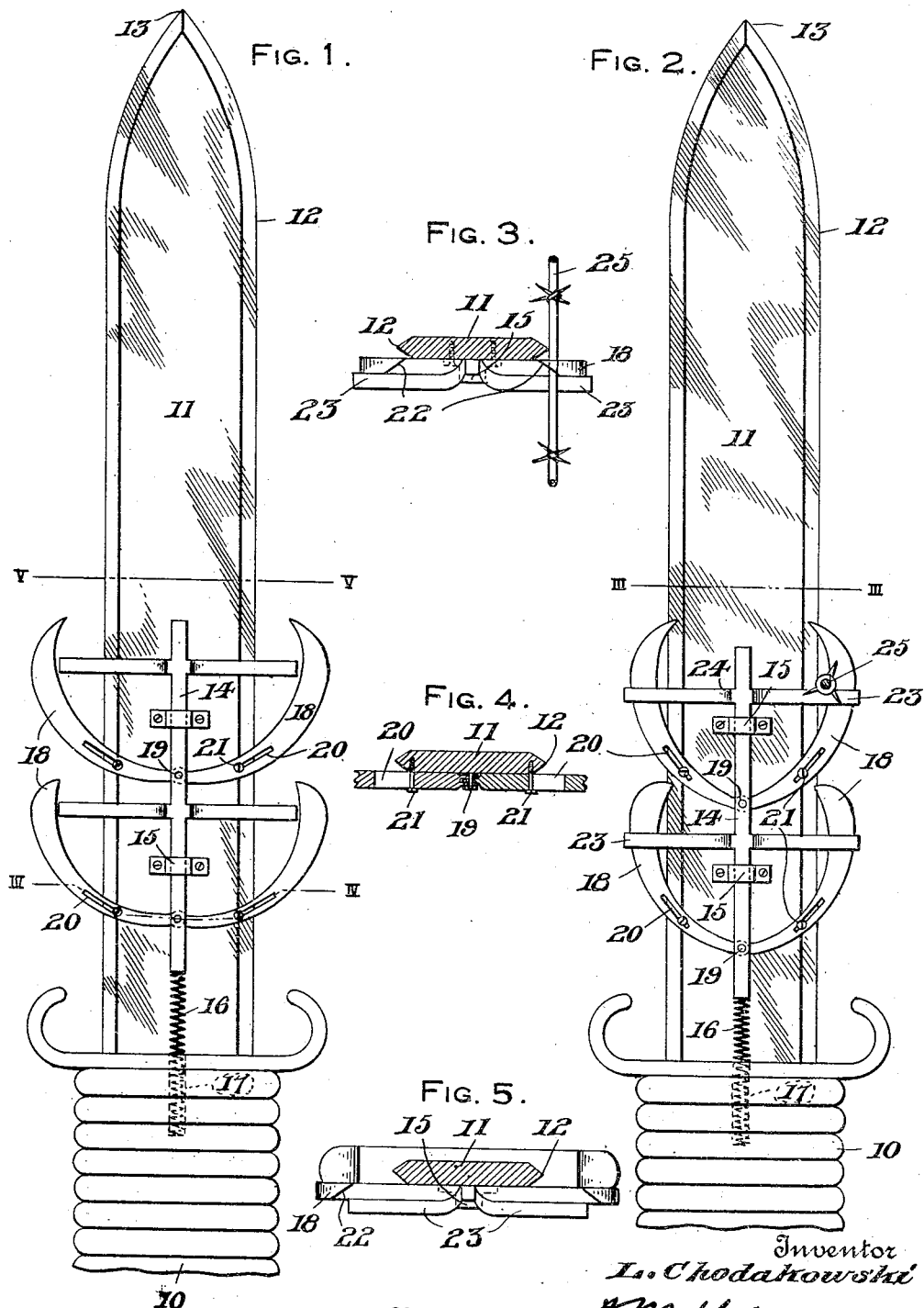

LEON CHODAKOWSKI, OF BINGHAMTON, NEW YORK.

WIRE-CUTTING BAYONET.

1,246,051.  Specification of Letters Patent.  Patented Nov. 13, 1917.

Application filed July 16, 1917. Serial No. 180,824.

*To all whom it may concern:*

Be it known that I, LEON CHODAKOWSKI, a citizen of Russia, residing at Binghamton, in the county of Broome and State of New York, have invented certain new and useful Improvements in Wire-Cutting Bayonets, of which the following is a specification.

The primary object of the invention is the provision of a bayonet or similar member adapted for cutting wire entanglements, such for instance, as those employed in times of war, whereby the barrier may be readily torn down by the advancing soldiers.

A further object of the device is the provision of a bayonet having shiftable blades adaptable as wire-cutters and operable upon forcibly engaging a wire with the present device.

A still further object of the invention is the provision of a wire-cutting bayonet that is easy and cheap to manufacture, possesses great strength and is light in weight for readily carrying by soldiers and arranged for immediate use for cutting wires and similar members when found desirable.

In the drawing forming a part of this application and in which like designating characters refer to corresponding parts throughout the several views, Figure 1 is an elevational view of the device with the wire-cutters normally positioned.

Fig. 2 is a similar view thereof showing the cutters in their operative position with respect to a barbed wire.

Fig. 3 is a transverse sectional view taken upon line III—III, of Fig. 2 and

Figs. 4 and 5 are transverse sectional views taken upon lines IV—IV and V—V respectively of Fig. 1.

Referring more in detail to the drawing a bayonet shaft 10 is illustrated having a blade 11 longitudinally extending therefrom provided with cutting side edges 12 and a pointed forward end 13. A bar 14 is slidably mounted upon one face of the blade 11 within brackets 15 while a spring 16 having a portion thereof arranged within a socket 17 in the shaft 10 bears against the rear end of the bar 14 normally projecting the same.

Pairs of arcuate cutting blades 18 are pivoted to the bar 14 as at 19, slots 20 being formed in the blades 18 for receiving headed screws 21 screwed into the bayonet blade 11 and by means of which the wire-cutting blades 18 are shiftably mounted upon the bayonet blade 11, and it will be evident that upon rearwardly moving the bar 14, the wire-cutters or blades 18 will be drawn toward the adjacent cutting edges 12 of the bayonet blade 11, it being noted that the inner edges of the cutters 18 are in the form of beveled cutting edges 22.

Cross bars 23 are arranged upon the bar 14, being in the nature of oppositely projecting arms bent upwardly at their points of connection with the bar 14 as at 24 for positioning outwardly of the cutters 18 during the operative inward movements of the latter. The operation of the device will be apparent from this detailed description thereof, it being understood that upon grasping the shaft 10 by the soldier, a barbed wire such as 25 may be received between the cutters 18 and the bayonet blade 11, whereupon a forcible forward movement of the bayonet brings the adjacent arm of one of the cross bars 23 in contact with the wire 25, and thereby rearwardly retracting the bar 14, drawing the cutters 18 inwardly toward the bayonet edges 12, as best illustrated in Fig. 2 of the drawing, and forcibly severing the wire 25. It will be understood, that a forcible contacting of one of the cross bars 23 with a wire will bring the cutting edges 12 and 22 in violent engagement with the opposite sides of the wire 25, while the bayonet may then be twisted if desired and the wire partly cut and partially broken apart.

A serviceable bayonet is provided whereby such obstructions as wire entanglements or barriers may be easily severed and broken down for the passage of troops.

What I claim as new is:—

1. A device of the class described comprising a shaft, a cutting bayonet projecting therefrom, pairs of arcuate wire cutters shiftably arranged upon the blade adjacent the opposite edges thereof, an operating bar for the said cutters carried by the blade and engaging arms arranged upon said bar overlying the cutters when the latter are retracted.

2. A bayonet having a shaft and a cutting blade, a bar longitudinally shiftably mounted upon said blade, a projecting spring for said bar, arcuate cutting blades pivoted to said bar and having sharpened inner edges adapted for movement transversely of the cutting edges of the blade and a cross bar upon the first named bar normally arranged within the planes of the cutting edges of the arcuate blades.

3. A bayonet comprising a shaft, a blade projecting therefrom and having opposite cutting edges, pivotally connected arcuate cutters carried by the blade and having inner cutting edges adapted for movement transversely of the cutting edges of the blade, shiftable operating means attached to the cutters at their pivotal points and means associated with said operating means adapted for normally maintaining the said cutters retracted at the extreme outward limit of their movements.

In testimony whereof, I affix my signature.

LEON CHODAKOWSKI.

Copies of this patent may be obtained for five cents each, by addressing the "Commissioner of Patents, Washington, D. C."